United States Patent

Uratani

[11] Patent Number: 5,850,593
[45] Date of Patent: Dec. 15, 1998

[54] MOBILE COMMUNICATION FOR A MOBILE STATION NEAR OR OUTSIDE A SERVICE AREA OF A BASE STATION

[75] Inventor: Chikara Uratani, Tokyo, Japan

[73] Assignee: NEC Corporation, Tokyo, Japan

[21] Appl. No.: 502,252

[22] Filed: Jul. 13, 1995

[30] Foreign Application Priority Data

Jul. 13, 1994 [JP] Japan ................................. 6-183953

[51] Int. Cl.⁶ ............................................. H04B 7/15
[52] U.S. Cl. ...................... 455/11.1; 455/15; 455/18; 455/422; 455/517; 370/321; 370/327
[58] Field of Search ...................... 455/7, 9, 11.1, 455/15, 18, 33.1, 54.1, 54.2, 56.1, 67.1, 422, 517, 524, 525; 370/293, 315, 321, 326, 327

[56] References Cited

U.S. PATENT DOCUMENTS

| | | | |
|---|---|---|---|
| 3,955,140 | 5/1976 | Stephens et al. | 455/11.1 |
| 4,539,706 | 9/1985 | Mears et al. | 455/11.1 |
| 4,549,293 | 10/1985 | Christian et al. | 370/347 |
| 4,882,765 | 11/1989 | Maxwell et al. | 455/11.1 X |
| 5,239,666 | 8/1993 | Truby | 455/67.1 X |
| 5,355,511 | 10/1994 | Hatano et al. | 455/11.1 |
| 5,533,027 | 7/1996 | Akerburg et al. | 455/15 X |
| 5,541,979 | 7/1996 | Leslie et al. | 455/11.1 X |

FOREIGN PATENT DOCUMENTS

| | | |
|---|---|---|
| 0086865A2 | 8/1983 | European Pat. Off. . |
| 0169384A1 | 1/1986 | European Pat. Off. . |
| 1-273443 | 11/1989 | Japan . |
| 5344037 | 12/1993 | Japan . |
| 1525443 | 9/1978 | United Kingdom . |
| WO8904569 | 5/1989 | WIPO . |
| WO9301664 | 1/1993 | WIPO . |
| WO9419877 | 9/1994 | WIPO . |

*Primary Examiner*—Reinhard J. Eisenzopf
*Assistant Examiner*—Philip J. Sobutka
*Attorney, Agent, or Firm*—Sughrue, Mion, Zinn, Macpeak & Seas, PLLC

[57] ABSTRACT

In a mobile communication network comprising a base station (11) having a service area (13) and a plurality of mobile stations, communication is rendered possible between the base station, with a first station (15(1)) in the service area used as a repeater station, and a second station (15(2)) which may be present near or beyond a boundary of the service area. It is presumed that the mobile stations are operable with battery saving and that such a repeater station exists in a communication area (17) of the second station put into full operation. Preferably, the mobile communication network is operable with time division multiplexing, with each frame composed of a predetermined number of time slots.

15 Claims, 4 Drawing Sheets

MOBILE COMMUNICATION FOR A MOBILE STATION NEAR OR OUTSIDE A SERVICE AREA OF A BASE STATION

BACKGROUND OF THE INVENTION

This invention relates to communication in a mobile communication network comprising a base station and a plurality of mobile stations movable in and outside a service area of the base station. More particularly, this invention relates to a communication method for a mobile communication network of the type described and to a mobile communication network which is of the type described and in which communication is possible between the base station and a mobile station even when the mobile station in question is near or outside a boundary of the service area.

A prior art communication network is disclosed in Japanese Patent Prepublication (A) No. 273,443 of 1989. The prior art communication network is a cordless telephone network comprising a plurality of base units having overlapped service areas and handsets carried through the service areas. In the cordless telephone network, a first base unit is for direct communication with first-unit handsets. A second base unit is for direct communication with second-unit handsets. Communication is possible between a second-unit handset and the first base unit even when the second-unit handset is outside the service area of the first base unit.

This is rendered possible by preliminarily connecting one of the first-unit handsets to the second base unit to use the second base unit as a repeater unit. More specifically, communication is possible between the second-unit handset and the second base unit. Used as the repeater unit, the second base unit is connected to the above-mentioned one of the first-unit handsets. Communication is possible between this one of the first-unit handset and the first base unit.

Being preliminarily connected together, the second base unit is near the above-mentioned one of first-unit handset, namely, in the service area of the first base unit. When the second base unit is outside this service area, communication is impossible between a second-unit handset and the first base unit. When the second base unit is near a boundary of this service area, it is difficult to carry on due communication. Furthermore, the prior art is not applicable to a mobile communication network comprising only one base station.

SUMMARY OF THE INVENTION

It is consequently an object of the present invention to provide a communication method which is for a mobile communication network comprising a base station and a plurality of mobile stations movable in and outside a service area of the base station and by which communication is possible between the base station and one of the mobile stations even when this one of the mobile stations is present near or beyond a boundary of the service area.

It is another object of this invention to provide a communication method which is of the type described and by which communication is possible with excellent communication qualities.

It is still another object of this invention to provide a mobile communication network which comprises a base station and a plurality of mobile stations movable in and outside a service area of the base station and in which communication is possible between the base station and one of the mobile stations even when this one of the mobile stations is present near or beyond a boundary of the service area.

It is yet another object of this invention to provide a mobile communication network which is of the type described and in which communication is possible with excellent communication qualities.

Other objects of this invention will become clear as the description proceeds.

In accordance with an aspect of this invention, there is provided a communication method for a mobile communication network comprising a base station having a service area, a first mobile station in the service area, and a second mobile station movable in the service area and beyond a boundary of the service area, wherein communication between the base station and the second mobile station is possible, even when the second mobile station is present near or beyond the boundary, by the steps of: (A) carrying out the communication between the base station and the first mobile station and (B) carrying out the communication between the base station and the second mobile station through the first mobile station.

In accordance with a different aspect of this invention, there is provided a mobile communication network comprising a base station having a service area, a first mobile station in the service area, and a second mobile station movable in the service area and beyond a boundary of the service area, wherein communication is possible between the base station and the second mobile station by using the first mobile station as a repeater station when the second mobile station is present near or beyond the boundary.

In accordance with a further different aspect of this invention, there is provided a mobile station for use in a mobile communication network comprising a base station having a service area and other stations movable in the service area and beyond a boundary of the service area, wherein the mobile station is movable in the service area and capable of dealing with direct communication with the base station and of serving as a repeater station for communication between the base station and at least one of the other stations that is present near the boundary or outside the service area and that has a communication area covering the mobile station.

DESCRIPTION OF THE PREFERRED EMBODIMENT

Figure 1:
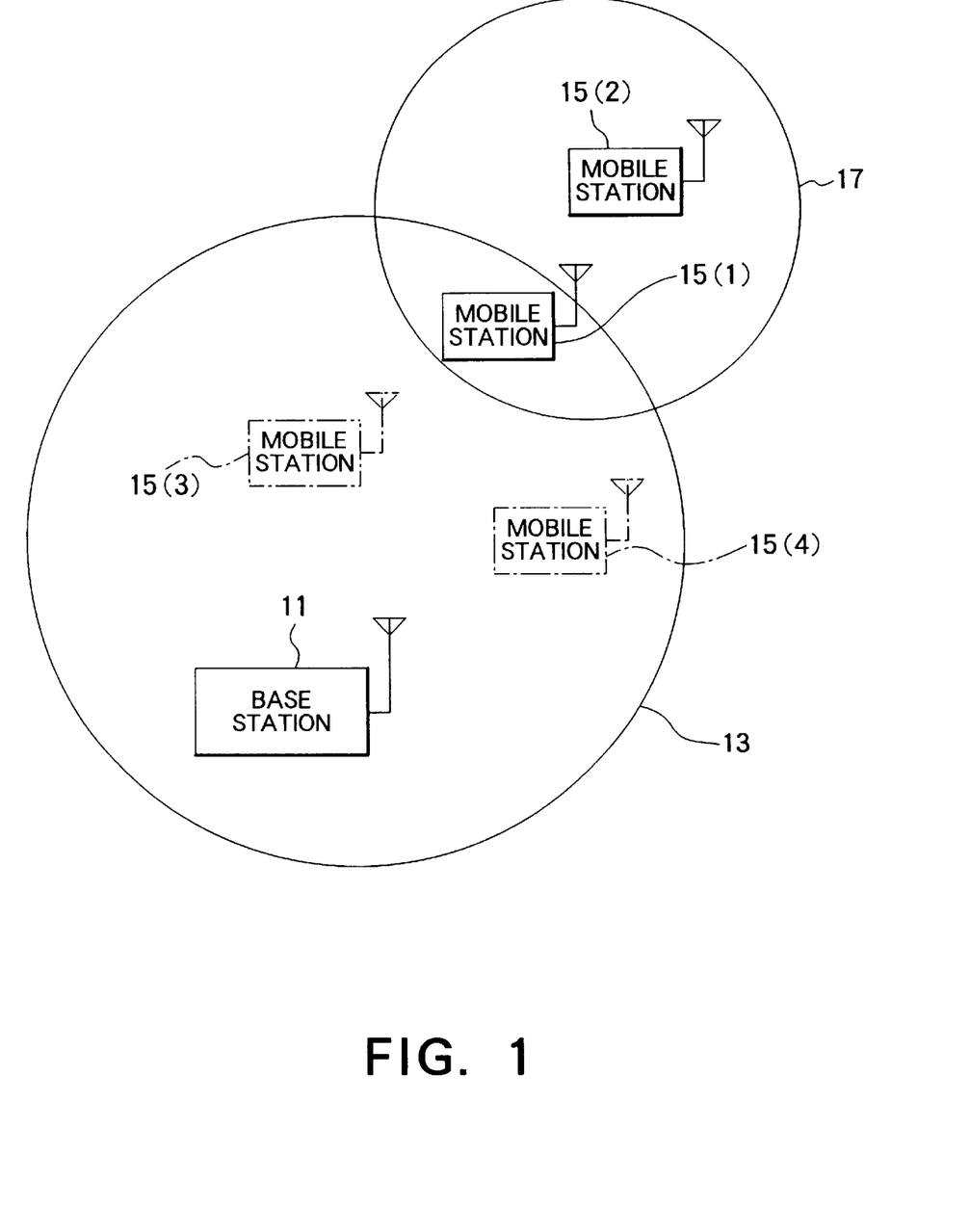
FIG. 1 shows a mobile communication network to which the instant invention is applicable.

Referring to FIG. 1, a mobile communication network for use in a preferred embodiment of the present invention is shown. The mobile communication network comprises a base station 11 having a service area 13 which has a boundary depicted by a circle without loss of generality. A plurality of mobile stations are movable in the service area 13 and may move near to the boundary and beyond the boundary. Such mobile stations are designated by a reference numeral 15 either collectively or individually and are assigned with identification numbers. In the manner known in the art, the mobile stations 15 are operable with battery saving. When put in full operation or rendered full alive, each mobile station 15 has a communication area 17 exemplified in conjunction with one alone of the mobile stations 15. While put fully alive, each mobile station 15 is capable of communication with the base station 11 and, through the base station 11, with a different station of any one of the mobile stations 15. According to this invention, each mobile station 15 is operable as a repeater station.

In FIG. 1, it will be assumed that the illustrated mobile stations 15 are all at least partially alive unless otherwise specifically mentioned. As depicted by solid lines, a first station 15(1) of the mobile stations 15 is in the service area 13 at a time. A second station 15(2) is present outside of the service area 13. As illustrated by dash-dot lines, third and fourth stations 15(3) and 15(4) are in the service area 13. It is alternatively possible to understand that the first and the third stations 15(1) and 15(3) show different positions which the first station 15(1) has during communication with the base station 11. This applies to the second and the fourth stations 15(2) and 15(4).

Figure 2:
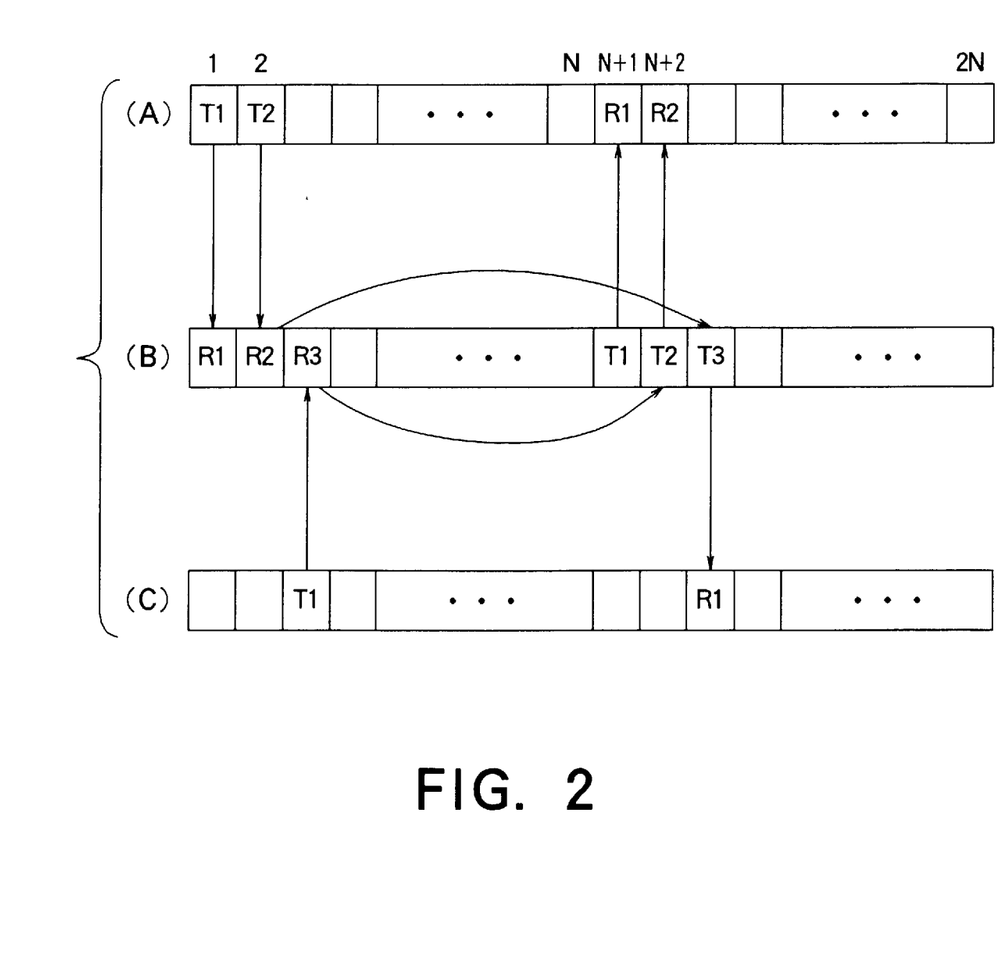
FIG. 2 exemplifies a manner of use of time slots in a mobile communication network according to an embodiment of this invention.

Turning to FIG. 2 with FIG. 1 continuously referred to, the mobile communication network is operable in a time division multiplex communication manner. Each frame of a radio carrier signal is composed of first, second, . . . , N-th, (N+1)-th, (N+2)-th, . . . , and 2N-th time slots, where N represents a predetermined integer dependent on the number of mobile stations 15 used in the mobile communication network and on traffic in the network. These time slots are indicated by slot numbers 1, 2, . . . , N, (N+1), (N+2), . . . , and 2N in the figure atop. Use of the time slots in the base station 11 is exemplified along a top row labelled (A). Those in the first and the second station 15(1) or 15(3) and 15(2) or 15(4) are exemplified along middle and bottom rows labelled (B) and (C).

For communication from the base station 11, the first through the N-th time slots are used in transmitting transmission signals. The (N+1)-th through the 2N-th time slots are used in receiving reception signals. On transmitting transmission signals to the first and the second stations 15(1) and 15(2), the base station 11 selects ones of idle time slots to use, for example, the first and the second time slots as first and second transmission slots T1 and T2. Although use of other time slots will later be described, it may be mentioned here that the (N+1)-th and the (N+2)-th time slots are used as first and second reception slots R1 and R2 for receiving reception signals from the first and the second stations 15(1) and 15(2).

On transmitting a transmission signal from an originating station of the base 11 and the mobile stations 15 to a destination station, the originating station first sends an information signal indicative of the identification number assigned to the destination station and of the slot number of a selected one of the time slots. After the destination station is rendered full alive in response to the information signal, the originating station sends a message signal.

Referring afresh to FIG. 3 and again to FIGS. 1 and 2, each mobile station 15 comprises a receiver 21 for receiving as a received signal a transmission signal sent from an originating station and received by an antenna of the mobile station 15 being illustrated. The received signal has a reception level of the carrier signal as caught by the antenna and includes a reproduction of the information signal transmitted from the originating station. Merely for brevity of the description, the reproduction will hereafter be referred to also as the information signal. In other words, the receiver 21 retrieves the information signal in the received signal.

Figure 3:
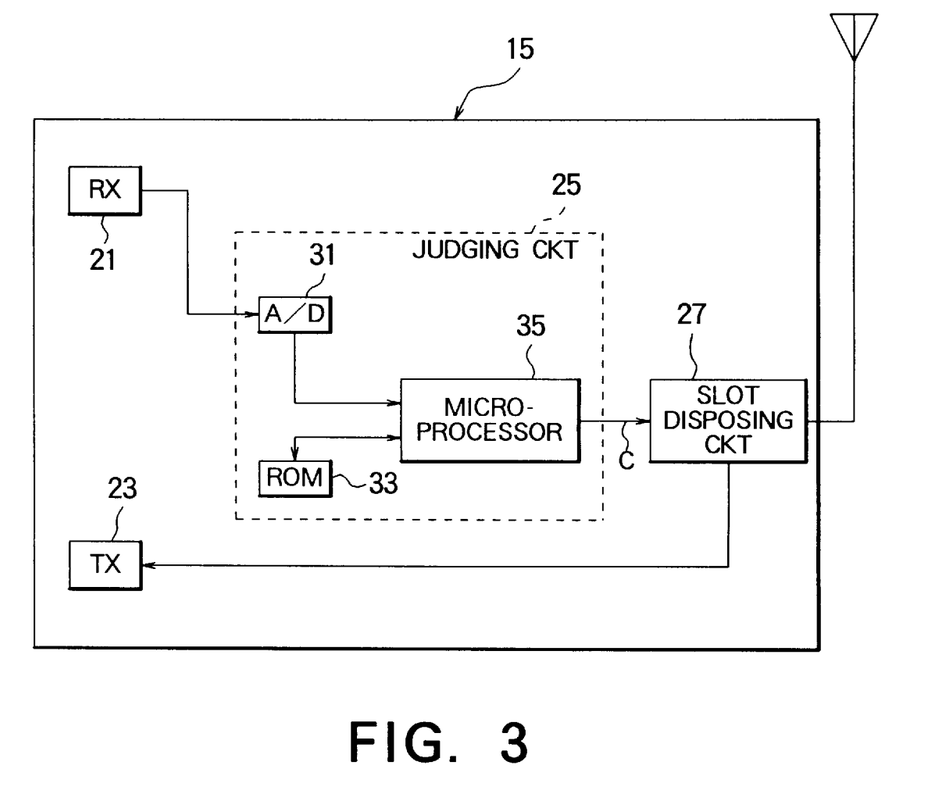
FIG. 3 is a block diagram of a mobile station for use in the mobile communication network mentioned in connection with FIG. 2.

The mobile station 15 comprises a transmitter 23 for transmitting a transmission signal as an originating station through the antenna to a destination station. This transmission signal will later be described in detail and includes another information signal. From the receiver 21, the received signal is delivered to a judging circuit 25 for judging whether or not the identification number indicates either the illustrated station or one of others of the mobile stations 15 that is an eventual destination station with the illustrated station used as the repeater station. When used as a destination station, the illustrated station is rendered full alive in the manner known in the art. Furthermore, the judging circuit 25 serves as a level judging circuit for judging whether or not the reception level is sufficient for communication with the originating station.

It will first be assumed that the illustrated station is the first station 15(1). If the reception level is sufficient and moreover if the originating station is the base station 11, the receiver 21 is kept in a state of receiving the message signal. The first station 15(1) selects an idle slot, such as the (N+1)-th time slot, as a transmission slot T1 of FIG. 2 (B) to make the transmitter 23 transmit a message signal to the base station 11. This time slot becomes the first reception slot R1 of FIG. 3 (A) at the base station 11. Direct communication is carried on between the base station 11 and the first station 15(1).

It will next be assumed that the illustrated station is the second station 15(2). When the reception level is insufficient as regards the carrier signal received from the base station 11, the level judging circuit 25 of the second station 15(2) judges the reception level of the carrier signal sent from a different one of the mobile stations. It will be presumed that the reception level is sufficient when the originating station of the carrier signal under consideration is the first station 15(1). In such an event, the level judging circuit 25 produces a control signal C indicative of this fact.

In FIG. 3, the control signal is delivered to a slot disposing or interchanging circuit 27. In FIG. 2 (B), the first station 15(1) receives the transmission signal from the base station 11 in the second time slot which serves for the first station 15(1) as a first reception slot R1. In the manner described in the foregoing, the (N+1)-th time slot is used in the first station 15(1) as the first transmission slot T1. When the received signal is received at the first station 15(1) in the second time slot used as a second reception slot R2 for further transmission to the second station 15(2), the control signal C puts the slot disposing circuit 27 into operation. It will be mentioned here that the (N+2)-th time slot is used in the first station 15(1) as a second transmission slot T2 in correspondence to the second reception slot R2 of FIG. 2 (A) and that the (N+3)-th time slot is idle. In the first station 15(1), the time slot disposing circuit 27 searches for such idle slots and selects the (N+3)-th time slot as a third transmission slot T3 to write contents of the second reception slot R2 in this selected slot. The transmitter 23 transmits a transmission signal in the third transmission slot towards the second station 15(2). This transmission signal includes the information signal indicative of the second station 15(2) and of the (N+3)-th time slot.

When the transmission signal is received at the second station 15(2) in the (N+3)-th time slot which serves as a first reception slot R1 depicted in FIG. 2 (C), the second station 15(2) receives the message signal which either originates at the base station 11 or is sent from another mobile station with the first station 15(1) used as the repeater station. On transmitting a message signal, the second station 15(2) selects an idle channel, such as the third time slot, as a first transmission slot T1 of FIG. 2 (C) and transmits a transmission signal towards the base station 11.

At the first station 15(1), this transmission signal is received as a received signal with the third time slot used as a third reception slot R3 depicted in FIG. 2 (B). Inasmuch as insufficient is the reception level of the carrier signal received from the base station 11, the level judging circuit 25 delivers the control signal C indicative of this fact to the slot disposing circuit 27. In response, the slot disposing circuit 27 selects the second transmission slot T2 (FIG. 2 (B)) and writes contents of the third reception slot R3 in the second transmission slot T2. The transmitter 23 transmits the transmission signal to the base station 11 with the control signal made to indicate the base station 11 and the third time slot as the second reception slot R2 at the base station 11. It is now appreciated that bidirectional communication is possible between the base station 11 and the second station 15(2) through the first station 15(1).

Referring more particularly to FIG. 3, the level judging circuit 25 comprises an analog-to-digital converter (A/D) 31 for converting the reception level of the received signal into digital data. A read-only memory (ROM) 33 is preliminarily loaded with reference data of the reception level. A microprocessor 35 compares the digital data with the reference data read out of the read-only memory 33 and produces the control signal C. The microprocessor 35 is typically of sixteen bits and may be that known as µPD70208 manufactured and sold by NEC Corporation, Tokyo, Japan.

Figure 4:
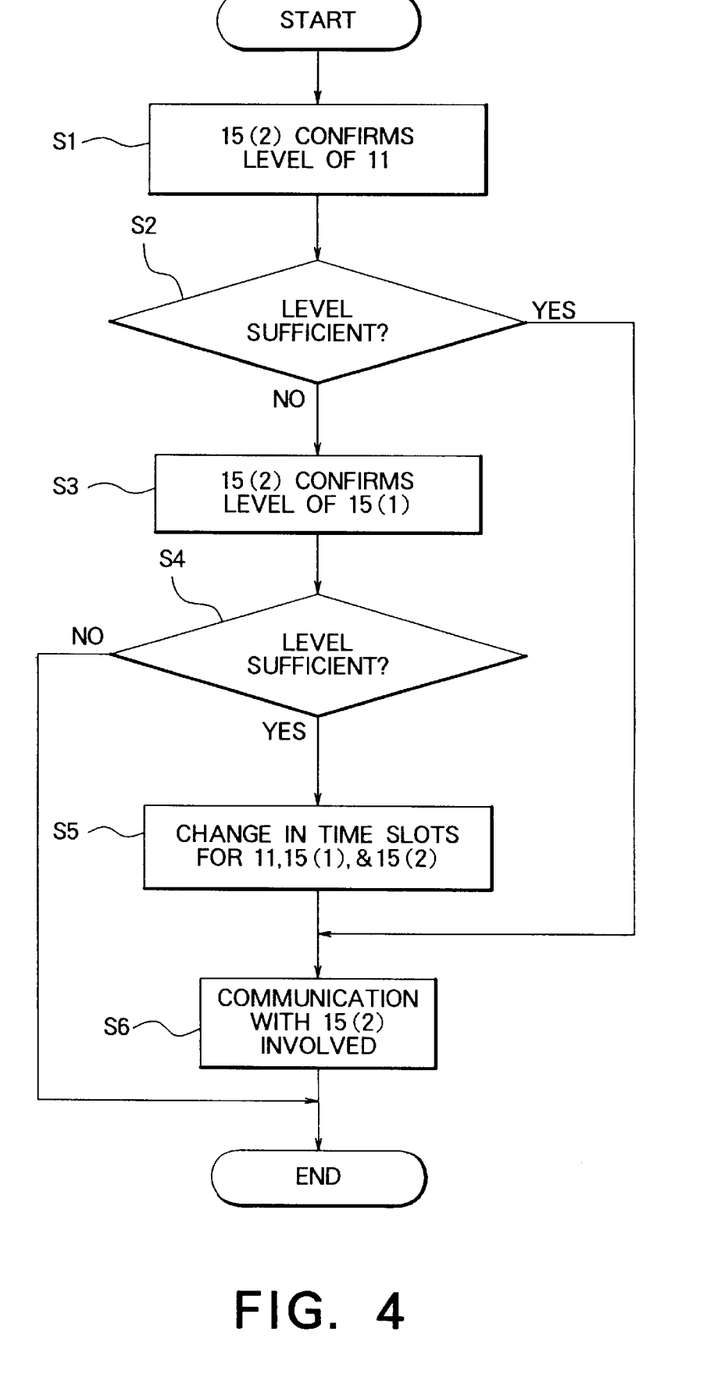
FIG. 4 shows a flow chart for use in describing operation of the mobile communication network being illustrated.

Referring to FIG. 4 with FIGS. 1 through 3 continuously referred to, operation of the mobile communication network will be described. It will be assumed that the second station 15(2) is either near the boundary of the service area 13 or outside the service area 13. As regards the carrier signal received from the base station 11, the second station 15(2) confirms the reception level as indicated at a first step S1 and judges at a second step S2 whether or not the reception level is sufficient. Even if received by the second station 15(2), the received signal has the reception level which is insufficient. In the manner indicated at a third step S3, the second station 15(2) confirms the reception level of the carrier signal received from the first station 15(1) or 15(3).

When the first station 15(1) or 15(3) is at the position indicated by the first station 15(1) in the communication area 17 of the second station 15(2), the reception level is judged at a fourth step S4 as sufficient. In this event, the level judging circuit 25 of the second station 15(2) produces the control signal C to put the second terminal 15(2) in full operation and to make the transmitter 23 of the second terminal 15(2) use the first transmission slot T1 of FIG. 2 (C) in transmitting the information signal to the first station 15(1). In the first station 15(1), the first through the fourth steps are carried out with the components of the mobile communication network changed accordingly, such as the base station 11 changed in the first step to the second station 15(2), and with the control signal used to dispose in FIG. 2 (B) the third reception slot R3 to the second transmission slot T2 and the second reception signal R2 to the third transmission slot T3. Such operations are indicated at a fifth step S5.

Under the circumstances, the second station 15(2) is made possible as indicated at a sixth step S6 to communicate with the base station 11 by using the first station 15(1) as the repeater station. When interchange of the message signals comes to an end, operation of the mobile communication network ends.

If the reception level is sufficient at the second step S2 as regards the base station 11, the second station 15(2) is at the position exemplified at the fourth station 15(4). The second station 15(4) is put at the sixth step S6 in direct communication with the base station 11. In the second station 15(4), the time slots are used in the manner described in conjunction with FIG. 2 (B) as the first and the second reception slots R1 and R2 and as the first and the second transmission slots T1 and T2. This operation applies to the first station 15(1) in the service area 13 and carries out the direct communication with the base station besides serving as the repeater station.

If the reception level is insufficient for the second station 15(2) at the fourth step S4 as regards the first station 15(1), the second station 15(2) is put into search for a different one of the mobile stations 15 that transmits an information signal received at the second station 15(2) with a sufficient reception level. If found, such a different station is used in the manner described in the foregoing in the fifth and the sixth steps S5 and S6. If no mobile stations are found at the fourth step S4, communication between the base station 11 and the second station 15(2) is impossible until either the second station 15(2) moves inside of the service area 13 or at least one of the mobile stations 15 moves into the communication area 17.

Figure 5:
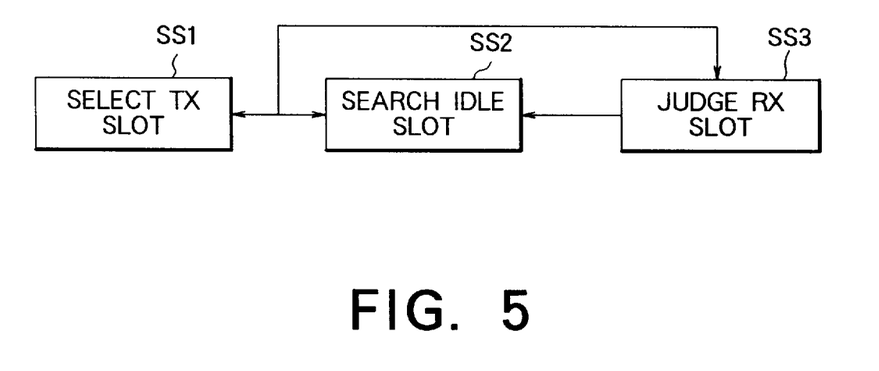
FIG. 5 shows in greater detail a part of the flow chart depicted in FIG. 4.

Turning to FIG. 5 with FIGS. 1 through 4 continuously referred to, the slot disposing circuit 27 is operable as follows. At a first detailed step SS1, the slot disposing circuit 27 selects a transmission slot for use in the mobile station 15 being illustrated. The transmission slot is the slot T1 in FIGS. 2 (B) or (C), the slot T2 in FIG. 2 (B), or the slot T3. Having selected with a transmission slot, the slot disposing circuit 27 makes the transmitter 23 first transmit the information signal.

In the meanwhile, the slot disposing circuit 27 receives the received signal, which may be delivered directly from the receiver 21. At a second detailed step SS2, the slot disposing circuit 27 judges the information signal included in the received signal as regards the reception slot which is used in the received signal and is judged as a judged slot. Using the transmission slot and the judged slot, the slot disposing circuit 27 searches at a third detailed step SS3 for idle slots.

When various time slots are already used as the slots R1, R2, R3, T1, and T2 exemplified in FIG. 2 along the middle row (B), the third detailed step SS3 is repeated by using the first detailed step SS1 and repeatedly using the second detailed step SS2. Thereafter, the first detailed step SS1 selects the transmission slot T3.

The base station 11 may comprise circuitry which is similar to the slot disposing circuit 27. In this event, it is possible for the circuitry to select the transmission and the reception slots for the base station 11 and for the mobile stations 15 including ones that are present near the boundary and outside the service area 13.

Reviewing FIGS. 1 through 5, the base station 11 may serve as an exchanging office for fixed terminals or substations in the known manner. It is possible to use different radio frequencies, such as a downward frequency for the first through the N-th time slots and the upward frequency for the (N+1)-th through the 2N-th time slots. In this event, N time slots are sufficient in each frame. For communication between the base station 11 and the second station 15(2), it is possible to use a plurality of successive repeater stations, as the fourth station 15(4) and the first station 15(1). Besides the base station 11, the mobile communication network may comprise similar base stations which are capable of communication with the base station 11 either through radio channels or through wired cables.

What is claimed is:

1. A communication method in a mobile communication system having a base station with a service area, a first mobile station in the service area and a second mobile station located near or beyond a boundary of the service area, comprising the steps of:

transmitting from said base station a first communication signal containing a first information signal;

when first data is received from said base station at said first mobile station, moving said first communication signal received in a first time slot into a second time slot for transmission to said second mobile station, forming a second communication signal;

receiving at said second mobile station in said second time slot the second communication signal sent from said first mobile station;

detecting at said second mobile station a first electric field intensity of said first communication signal from said base station, said second mobile station determining whether or not said first electric field intensity is sufficient to carry on communication between said base station and said second mobile station and receiving said first communication signal and said first information signal contained therein at said second mobile station from said base station when said first electric field intensity is sufficient;

determining at said second mobile station whether or not a second electric field intensity of a carrier signal from said first mobile station is sufficient to carry on communication between said second mobile station and said first mobile station; and repeating said first communication signal at said first mobile station as said second communication signal, wherein said first mobile station changes said first information signal in said first time slot to a second information signal in said second time slot for transmitting to said second mobile station when said first electric field intensity is insufficient and said second electric field intensity is sufficient to carry on communication between said first mobile station and said second mobile stations;

transmitting from said second mobile station in a third time slot a third communication signal towards said base station, said third communication signal being received by said first mobile station; and when said third communication signal is received from said second mobile station at said first mobile station, moving the third communication signal received in said third time slot into a fourth time slot for transmission to said base station.

2. A mobile communication network operable according to time division multiplexing, comprising:

a base station having a service area;

a first mobile station in said service area; and a second mobile station movable in said service area and beyond a boundary of said service area;

wherein communication is possible between said base station and said second mobile station by using said first mobile station as a repeater station when said second mobile station is near or beyond said boundary;

said first mobile station being configured to receive a first communication signal sent in a first time slot from said base station and being further configured to move said first communication signal into a second time slot for transmitting said first communication signal to said second mobile station when said second mobile station is near or beyond said boundary;

said first mobile station being configured to receive a second communication signal sent in a third time slot from said second mobile present near or beyond said boundary and being configured to move said second communication signal into a fourth time slot for transmitting said second communication signal to said base station;

wherein said base station is configured to transmit said first communication signal, wherein said first communication signal contains a first information signal;

said second mobile station having a means for determining whether or not a first electric field intensity of said first communication signal is sufficient to carry on communication between said second mobile station and said base station, said means for determining means also determining whether or not a second electric field intensity of a carrier signal from said first mobile station is sufficient to carry on communication between said second mobile station and said first mobile station;

said second mobile station being configured to receive said first communication signal and said first information signal contained in said first communication signal from said base station when said first electric field intensity is sufficient to carry on communication between said second mobile station and said base station;

said first mobile station serving as said repeater station to repeat said first communication signal when said first electric field intensity is insufficient to carry on communication between said second mobile station and said base station and said second electric field intensity is sufficient to carry on communication between said second mobile station and said first mobile station, said first mobile station having a means for changing said first information signal to a second information signal for transmitting to said second mobile station.

3. A mobile communication network as claimed in claim 2, wherein each mobile station of said first and said second mobile stations comprises:

receiving means for receiving a first transmission signal as a first received signal from one of said base station and others of said mobile stations by using an information signal corresponding to said first time slot in said first transmission signal;

transmitting means for transmitting a second transmission signal in said second time slot to said one of base station and others of said mobile stations with an information signal corresponding to said second time slot is included in said second transmission signal;

level judging means for judging a reception level of said first received signal to produce a control signal in compliance with the information signal when said reception level is greater than a predetermined level; and slot disposing means responsive to said control signal for producing the information signal corresponding to said second time slot and for disposing contents of said first received signal in said second transmission signal when said reception level is not greater than said predetermined level.

4. A mobile communication network as claimed in claim 3, wherein:
said receiving means is configured to receive said first transmission signal from said base station in response to said control signal;
said transmitting means is configured to receive said second transmission signal in response to said control signal.

5. A mobile communication network as claimed in claim 3, wherein:
said receiving means receives said first transmission signal from one of said other of mobile stations when said reception level is not greater than said predetermined level;
said level judging means producing said control signal when said predetermined level is exceeded by the reception level of the first received signal received from said one of others of mobile stations;
said transmitting means transmitting said second transmission signal to said one of others of mobile stations in response to said control signal.

6. A mobile station for use in a mobile communication network, operable according to time division multiplexing, which includes a base station having a service area and other stations movable in said service area and beyond a boundary of said service area, comprising:
a mobile station being movable in said service area and capable of direct communication with said base station and capable of serving as a repeating station for communication between said base station and at least one of said other stations when said at least one of said other stations is near said boundary or outside said service area and has a communication area covering said mobile station;
wherein said mobile station is configured to receive a first communication signal sent in a first time slot from said base station and is configured to move said first communication signal into a second time slot for transmitting to said at least one of stations; and
wherein said mobile stations are further configured to receive a second communication signal sent in a third time slot from said at least one of others of mobile stations and configured to move said second communication signal into a fourth time slot for transmitting to said base station; and
wherein said first communication signal sent from said base station contains a first information signal;
said at least one of said other stations being capable of determining whether or not a first electric field intensity of said first information signal is sufficient to carry on communication between said base station and said at least one of said other stations, and being further capable of determining whether or not a second electric field intensity is sufficient to carry on communication between said mobile station and said at least one of said other stations;
said at least one of other of mobile stations configured to receive said first communication signal by using said first information signal when said first electric field intensity is sufficient to carry on communication between said base station and said at least one of said other stations;
said mobile station serving as said repeater station to repeat said first communication signal to said at least one of said other stations when said first electric field intensity is insufficient to carry on communication between said base station and said at least one of said other stations and said second electric field intensity is sufficient to carry on communication between said mobile station and said at least one of said other stations; said mobile station having means for changing said first information signal in said first communication signal to a second information signal in said second communication signal for transmitting said repeated information signal to said at least one of stations.

7. A mobile station as claimed in claim 6, further comprising:
receiving means for receiving a first transmission signal as a first received signal from one of said base station and said other stations by using an information signal corresponding to said first slot in said first transmission signal;
transmitting means for transmitting a second transmission signal in said second time slot to said one of base station and other stations with an information signal corresponding to said second time slot is included in said second transmission signal;
said judging means for judging a reception level of said first received signal to produce a control signal in compliance with the information signal when said reception level is greater that a predetermined level; and
slot disposing means responsive to said control signal for producing the information signal corresponding to said second time slot and for disposing contents of said first received signal in said second transmission signal when said reception level is not greater than said predetermined level.

8. A mobile station as claimed in claim 7, wherein:
said receiving means is configured to receive said first transmission signal from said base station in response to said control signal;
said transmitting means is configured to transmit said second transmission signal in response to said control signal to said base station.

9. A mobile station as claimed in claim 7, wherein:
said receiving means receives said first transmission signal from one of said other stations when said reception level is not greater than said predetermined level;
said level judging means producing said control signal when said predetermined level is exceeded by the reception level of the first received signal received from said one of other stations;
said transmitting means transmitting said second transmission signal to said one of other stations in response to said control signal.

10. A mobile communication network comprising:
a base station having a service area; and
a plurality of mobile stations including a first mobile station in said service area, and a second mobile station movable in said service area and beyond a boundary of said service area;
each of said plurality of mobile stations including:
receiving means for receiving a first transmission signal as a first received signal from one of said base station and others of said plurality of mobile stations by using an information signal contained in said first transmission signal corresponding to a first time slot in said first transmission signal;
transmitting means for transmitting a second transmission signal in a second time slot to said one of base station and others of said plurality of mobile stations with an information signal corresponding to said second time slot included in said second transmission signal;

level judging means for judging a reception level of said first received signal to produce a control signal in compliance with the information signal corresponding to said first time slot when said reception level is greater than a predetermined level; and slot disposing means responsive to said control signal for producing the information signal corresponding to said second time slot and for disposing contents of said first received signal in said second transmission signal when said reception level is not greater than said predetermined level;

wherein communication is possible between said base station and said second mobile station by using said first mobile station as a repeater station when said second mobile station is near or beyond said boundary.

11. A mobile communication network as claimed in claim 10, wherein:

said receiving means is configured to receive said first transmission signal from said base station in response to said control signal;

said transmitting means is configured to receive said second transmission signal in response to said control signal.

12. A mobile communication network as claimed in claim 10, wherein:

said receiving means receives said first transmission signal from said one of said plurality of mobile stations when said reception level is not greater than said predetermined level;

said level judging means producing said control signal when said predetermined level is exceeded by the reception level of the first received signal received from said one of said plurality of mobile stations;

said transmitting means transmitting said second transmission signal to said one of said plurality of mobile stations in response to said control signal.

13. A mobile station for use in a mobile communication network which includes a base station having a service area and other mobile stations movable in said service area and beyond a boundary of said service area, comprising:

receiving means for receiving a first transmission signal in as a first received signal from one of said base station and said other stations by using an information signal correponding to a first time slot in said first transmission signal;

transmitting means for transmitting a second transmission signal in a second time slot to said one of base station and other mobile stations with an information signal corresponding to said second time slot included in said second transmission signal;

said judging means for judging a reception level of said first received signal to produce a control signal in compliance with the information signal corresponding to said first time slot when said reception level is greater that a predetermined level; and slot disposing means responsive to said control signal for producing the information signal corresponding to said second time slot and for disposing contents of said first received signal in said second transmission signal when said reception level is not greater than said predetermined level;

said mobile station being movable in said service area and capable of direct communication with said base station and capable of serving as a repeating station for communication between said base station and at least one of said other mobile stations when said at least one of said other mobile stations is near said boundary or outside said service area and has a communication area covering said mobile station.

14. A mobile station as claimed in claim 13, wherein:

said receiving means is configured to receive said first transmission signal from said base station in response to said control signal;

said transmitting means is configured to transmit said second transmission signal in response to said control signal to said base station.

15. A mobile station as claimed in claim 13, wherein:

said receiving means receives said first transmission signal from one of said other mobile stations when said reception level is not greater than said predetermined level;

said level judging means producing said control signal when said predetermined level is exceeded by the reception level of the first received signal received from said one of other mobile stations;

said transmitting means transmitting said second transmission signal to said one of other mobile stations in response to said control signal.

* * * * *